United States Patent Office 3,498,827
Patented Mar. 3, 1970

3,498,827
ABRASION RESISTANT METAL ARTICLES
Byron M. Vanderbilt, Westfield, Stuart M. Kaback, Roselle Park, and Stephen A. Yuhas, Jr., Perth Amboy, N.J., assignors to Esso Research and Engineering Company, a corporation of Delaware
No Drawing. Filed Feb. 2, 1966, Ser. No. 524,502
Int. Cl. B44d 1/14, 1/36
U.S. Cl. 117—75         6 Claims

ABSTRACT OF THE DISCLOSURE

An article of manufacture particularly a pipe is coated with an initial layer of an oxygenated thermosetting resin and a second layer of an oxygenated thermosetting resin plus a silane and finely ground quartz particles. The article, i.e. pipe, is extremely resistant to abrasion and corrosion. Not only can the process be used to form protective coatings but the material containing the hard particles can be used to form abrasive products.

---

This invention relates to abrasion resistant compositions, coating compositions, metal articles coated with said compositions and to methods for preparing said compositions and said coated articles. In its greatest particularity, it relates to coatings for and to coated metal pipes which are to be used for underground pipelines and the invention will be described further herein with respect to metal pipes as a specific preferred embodiment although it is to be expressly understood that the invention is not so limited. It relates also to abrasive products.

External coatings are applied frequently to pipelines intended to carry liquids such as hydrocarbons and to be buried in the soil. These coatings have the primary purpose of protecting such pipelines against external corrosion. They have a secondary purpose of protecting such pipelines against mechanical abrasion from external means such as incurred through shipment and handling or from rocks which may fall on or be driven against or along pipelines during burying operations. Commonly used coating materials are those having a petroleum asphalt or coal tar base. These are applied directly on a pipe surface in thicknesses in the range of 60 to 100 mils, for example, 90 mils. The coating of asphalt or coal tar which constitutes the primary means of protection of the pipeline is ordinarily provided with a wrapping of such materials as kraft paper; asbestos felt, or glass cloth.

Variations are used where the innermost or first layer is from 2 to 5 mills thick and usually comprises an oxidized oily polymer resin which is both resistant to hydrocarbon attack and strongly inhibitive of corrosion, and the next succeeding or second layer from 60 to 100 mils thick comprises petroleum asphalt or coal tar which performs the customary mechanical shielding function.

Asphalt and coal tar base coatings have at least two significant deficiencies for service on pipelines, namely, their lack of impact resistance and their susceptibility to dissolution by hydrocarbon liquids. These liquids will attack a pipeline coating externally if they are present in the surrounding soil due to a leak or break in the pipeline and its coating or from other sources. Wrapping materials such as those cited will not protect the principal asphalt or coal tar coating from external hydrocarbon attack because these materials are themselves soluble in or permeable by hydrocarbon liquids.

It is possible also for asphalt or coal tar applied on a pipeline to be attacked from the inside out. Such attack will occur if a pipeline carrying hydrocarbon liquid develops a very slow leak. The leaking liquid, even though not emerging with sufficient force to rupture the asphalt or tar pipeline coating, will dissolve the coating locally immediately adjacent the pipe, and continue this action outwardly and along the pipe so long as leakage persists. Hydrocarbon dissolution of a pipeline coating from the inside out is, however, a problem of less importance than that of external dissolution due to hydrocarbon impregnated soil.

Coal tar base coatings are less susceptible to hydrocarbon attack than are those having an asphalt base, but their susceptibility to such attack is still sufficiently great to constitute a noticeable disadvantage of these materials for underground petroleum pipeline service. The ultimate potentially deleterious possibility with either asphalt or coal tar coatings is, of course, that the steel pipe surface will become exposed for local corrosion by chemicals or electrolytic circuits in the soil should a patch of coating be dissolved entirely.

Finding increasing use, however, are thin mil or thin film coatings. These coatings are applied in thicknesses of about 30 mils or less. They include protective tapes, extruded plastic, and fusion-bonded plastic. Most widely employed are extruded plastic coatings.

Protective tapes are normally made from polyvinyl chloride or polyethylene, and can be applied both in the field and in shop operations. Extruded plastic coatings cannot be handled satisfactorily in most field operations. A good example of an extruded coating is Rejublic Steel's X-Tru-Coat plastic coated pipe. First an elastic adhesive base coat is applied hot to the pipe. Then, high density polyethylene is extruded over the base coat. These are relatively expensive coatings.

Fusion-bonded plastic coatings—coatings applied by heating the pipe and contacting it with resin powder which fuses to the pipe—are also limited to mill application. Epoxy resin is generally used.

One advantage of the instant invention is that the novel coated metal articles, particularly petroleum carrying pipelines, are not only protected against corrosion but concomitantly the coating is resistant to mechanical damage from external means and will present both an indissoluble barrier to hydrocarbon attack from without and and indissoluble barrier to such attack from within. In ias most preferred form, the final coated material is made up of two separately applied layers. One layer is made up of one or more, preferably two, separately cured coats, of a clear Buton pipe coating resin prepared from three parts of Buton 300 and one part of Buton 200 in a half part of Solvesso 100. The total thickness of these layers is about two to six, preferably 3 to 5, and most preferably about 4 mils, on a dry basis, and they are cured to a hardness of about HB (pencil).

To this cured coat of one or more layers is added an additional layer comprising a top coat of separately formulated Buton pipe coating resin, a preferred formulation comprising in parts by weight of solids about 40 parts of Buton 200 or Buton 300, or a blend of Buton 300 and Buton 200 in any proportions, 60 parts of finely divided silica which will be no larger than about 100 mesh and a minor portion of an epoxy substituted organic silane dissolved therein. The total thickness of this coat is about 2 to 6, preferably 3 to 5, and most preferably about 4 mils, on a dry basis.

The preferred fluid coating composition can be generally described as an air blown polymer prepared from diolefins, particularly those having 4 to 6 carbon atoms per molecule, such as butadiene, isoprene, dimethyl butadiene, piperylene and methyl pentadiene. Diolefins as described above copolymerized with minor amounts of ethylenically unsaturated monomers such as styrene, acrylonitrile, methyl vinyl ketone, or with substituted styrenes such as those having alkyl groups substituted on the rings such as methyl styrenes and dimethyl styrenes can also be used.

A preferred diolefin polymer is one prepared by reacting 75 to 100 parts of butadiene and 25 to 0 parts of styrene in the presence of metallic sodium catalyst. Polymerization is carried out in a reaction diluent at temperatures from about 25° to 105° C. with about 0.5 to 5 parts of finely divided sodium per 100 parts of monomers used. The diluent used in the polymerization must boil between about −15° and 200° C. and is used in amounts ranging from 100 to 500 parts per 100 parts of monomers.

Preferred diluents are aliphatic hydrocarbons such as solvent naphtha or straight run mineral spirits such as Varsol. In order to obtain a water white product, a codiluent, in amounts of about 10 to 45 parts per 100 parts of monomers, may also be used, consisting of a $C_4$ to $C_8$ aliphatic ether or cyclic ethers and polyethers other than those having a —O—C—O— grouping. Particularly useful ethers are 1,4-dioxane and diethyl ether. Finally, it is beneficial to use about 5 to 35 wt. percent (based on sodium) of an alcohol such as methanol, isopropanol, or an amyl alcohol in order to overcome the initial induction period. The resulting product may vary in viscosity from 0.15 to 20 poises. The preparation of this oil is described in U.S. Patent 2,762,951, which is incorporated herein by reference.

In another method, the polymer can be prepared by aqueous emulsion polymerization in the presence of relatively large amounts of mercaptan modifiers. In still another method, the liquid polymer can be produced in the presence of hydrofluoric acid as the catalyst. The polymer can also be prepared by the use of $BF_3$-ethyl ether complex catalyst as described in U.S. Patent 2,708,639, also incorporated herein by reference; or by the use of a peroxide catalyst such as t-butyl hydroperoxide as described in U.S. Patent 2,586,594, likewise incorporated herein by reference. Also, suitable polymers can be prepared by the use of butyl lithium catalysts.

The polymers obtained by any of the above methods may be used as synthesized or they may be modified with maleic anhydride in accordance with the teachings of U.S. Patent 2,652,342.

These polymers which are usually obtained as oils are then oxidized by blowing them with air or oxygen, preferably in the presence of a solvent such as aromatic solvents or solvent mixtures having a Kauri Butanol value of at least 40. The oxidation produces a complex mixture of polymers containing hydroxy, carboxy and carbonyl functionality. The choice of solvents will depend upon the oxygen content desired in the finished oil, the formulation of the coating compositions, and the one most economically suitable to achieve the desired results.

These polymers can also be modified by other chemical techniques such as epoxidation, hydroxylation, carboxylation and the like.

Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron and manganese. The naphthenates, octanoates, and oleates are especially suitable. These catalysts are used in amounts ranging from 0.001 to 0.10%. The nature of the oxidized diolefin polymer largely depends upon the type of original polymerization and the extent of oxidation which is dependent upon various factors such as time, temperature, catalyst and solvent. Preferred compounds are the oxidized copolymers of 75 to 85% butadiene and 25 to 15% styrene with about 5 to 20% oxygen in the structure. The unoxidized starting compounds will preferably have a molecular weight of about 1800 to 3500, preferably 2000 to 3000 and most preferably about 2300 to 2600 (viscosity average). This technique of oxygen-blowing has been fully described in U.S. Patent 3,196,121 which is incorporated herein by reference.

Especially preferred are resins which are commercially available from the Enjay Chemical Company as Buton 200 or Buton 300 or as a mixture of Buton 200 and Buton 300, Buton 320 and the like. These are described in a brochure published in 1964 by Enjay Chemical Company entitled "Solvents/Resins/Plasticizers For the Coatings Industry," which is incorporated herein by reference.

Buton 100, the basic resin, is an all-hydrocarbon copolymer with a molecular weight of approximately 2000 and a high degree of unsaturation (iodine number=300). Physically, Buton 100 is a viscous (3500 poise), clear, almost colorless liquid. Its utility in coatings lies mainly in special applications, such as can linings, thin clear coatings, and as a chemical intermediate in other reactions.

Buton 200 and Buton 300 are prepared by chemically modifying Buton 100 in a manner as described above to introduce polar groups such as hydroxyls, carbonyls and carboxyl groups. The resulting polymers have a new, much more active chemical nature, slightly lower unsaturation, and are supplied in solutions. Buton 200 and 300 extend the range of applications for which Buton 100 is suitable by providing greater compatibility with other resins, better pigment wetting characteristics, and the ability to produce hard films at thicknesses greater than 1.2 mils. Consequently, the Buton family of resins has found application through a wide range of surface coating preparation techniques.

Descriptive characteristics of the three polymers are recorded in Table I. Here it should be noted that Buton 100 is supplied in a solvent free state while Buton 200 and 300, as described above, are supplied in solution. The solvent employed is predominantly aromatic in nature with isopropyl alcohol being employed as a secondary solvent and viscosity stabilizer. Alternatively, oxygenated solvents can be used, such as ketones and the like. Buton 320 is an example of an oxygenated polymer prepared and used in methylisobutyl ketone in the process of the invention. Blends of different polymers can also be used. Solutions of the Buton resins have comparatively low viscosities and are readily employed in surface coatings. No significant viscosity increases are noted on storage for periods as long as one year. For most purposes, Buton solutions are sufficiently pale to prepare white and light colored pigmented products.

TABLE I.—PHYSICAL PROPERTIES OF BUTON RESINS

| Typical Inspections | Buton 100 | Buton 200 | Buton 300 |
|---|---|---|---|
| Nonvolatile matter, wt. percent | 100 | 50 | 45 |
| Solvent Blend, wt. percent: | | | |
|   Solvesso Xylol | | | 60 |
|   Enjay Isopropyl Alcohol (Anhydrous) | | 25 | 40 |
|   Solvesso 100 | | 75 | |
| Specific gravity, 20/4 °C | 0.915 | 0.925 | 0.948 |
| Lb./Gallon, 77° F | 7.65 | 7.7 | 7.8 |
| Lb./Gallon, Solids, 77° F | 7.65 | 8.5 | 9.2 |
| Viscosity, Gardner Bubble | ¹ C–E | H–L | E–H |
| Color, Gardner, Max | 1 | 7 | 10 |
| Acid Number, mg. KOH/g., Max | | 12 | 16 |
| Flash Point (Tag Open Cup), °F | 200 | 75 | 75 |
| Reducing Solvents | Aliphatic or aromatic hydrocarbons | | |

¹ On 50 wt. percent solution in Varsol.

The particularly preferred oxidized butadiene polymers and copolymers as exemplified by the Buton 200 and 300 series have never been known to respond to silane bonding between the Buton and an inorganic surface such as silica or glass. The oxidized polybutadiene polymers are a complex chemical mixture containing at least hydroxy, carboxy and carbonyl functionality and are quite dissimilar to epoxy, polyesters or Buton 100 resins. Moreover, the art has not appreciated that silanes can be used to prepare improved surface coatings which can be cured by oxidation by the atmosphere, preferably accelerated by heat. Thermosetting resins utilizing silanes to bond to glass and other siliceous materials are cured by means of peroxides or so-called hardening agents such as amines, anhydrides, aldehydes, etc. Furthermore, molding compositions and laminates which conventionally contain silica fillers and other inorganic fillers must be cured under pressure to produce satisfactory products.

It is a preferred feature of this invention as it relates to protection of metal articles that the silica particles are not next to the metal surface, but are in the outer layer. If silica and Buton were in combination directly adjacent to the metal surface without an intermediate protective coating, the whole combination would fail rapidly under cathodic protection. The reason for this is not known but it is believed that the silica interferes with the bonding of the resin to the metal surface.

The particles size of the filler material, i.e., silica, is quite important since it has been discovered that relatively large particle sizes such as those used in U.S. Patent 2,930,710 produce coated materials which do not have high abrasion resistance.

Thus, the concept of the invention can be summarized as a means of solving the problem of using oxidized butadiene-type resins on metal articles, specifically pipes. It has been previously observed that Buton pipe coatings will provide excellent corrosion protection if they are continuous and have not been scratched or broken either during handling or by contact with sharp objects in the soil. The heart of the invention resides in providing an initial Buton coating on a metal article which coating has excellent electrical and chemical properties to provide superior corrosion resistance, and placing on the top of this initial coating a top coating formulation comprising Buton, silica and silane in order to provide outstanding mechanical protection to the bottom layer.

In general, the class of silanes which is preferred for use in this invention are the chemically substituted silanes in which the substituted group is not attached directly to the silicon atom but to a carbon atom, and more preferably to a carbon atom not bonded to a silicon atom. Examples are epoxy, mercapto, chloro, bromo, hydroxy, amino, carboxy and keto substituted silanes. Unsaturated silanes, such as vinyl and methacryloxy alkyl silanes may be used, but the substituted types are preferred. The epoxy silanes are particularly effective.

The silanes useful in the instant invention are defined by the following general structure:

wherein $R_1$ is a substituted or unsaturated organic group including but not limited to alkenyl, aminoalkyl, epoxyalkyl, epoxyaryl, epoxyaralkyl, epoxycycloalkyl, mercapto-alkyl, acryloxyalkyl, and methacryoxyalkyl groups; X is selected from the group consisting of halogen, hydroxyl, acyloxy, and alkoxy; and $R_2$ and $R_3$ are each independently selected from the group consisting of $R_1$, X and methyl. The number of carbon atoms in the moleule can vary over a wide range but usually will not exceed 20. Specific suitable compounds are as follows:

gamma amino-propyl-triethoxysilane,
beta amino-ethyl-triethoxysilane,
gamma amino-propyl-trimethoxysilane,
gamma acryloxypropyl trimethoxysilane
gamma methacryloxypropyl dimethyl chlorosilane,
gamma (methacryloxyethoxy) propyl trimethoxysilane,
gamma methacryloxypropyl methyl diacetoxysilane,
vinyl trichlorosilane,
vinyl dimethylchlorosilane,
vinyl tris-2-methoxyethoxy silane,
divinyl dichlorosilane,
trivinyl chlorosilane,
divinyl diethoxysilane,
allyl trimethoxysilane,
allyl trichlorosilane,
allyl tris-2-methoxyethoxysilane,
gamma glycidoxypropyl trimethoxysilane,
beta(3,4-epoxy cyclohexyl)ethyl trimethoxysilane,
beta methacryloxyethyl trimethoxysilane,
gamma methacryloxypropyl trimethoxysilane,
beta glycidoxyethyl triethoxysilane,
beta(3,4-epoxy cyclohexyl)ethyl tri(methoxyethoxy) silane,
beta(3-epoxyethyl phenyl)ethyl trimethoxysilane,
beta(epoxyethyl)ethyl triethoxysilane,
4,5-epoxy-n-hexyl trimethoxysilane,
15,16-epoxy-n-hexadecyl trimethoxysilane,
3-methylene,7-methyl-6,7-epoxy octyl trimethoxysilane,
N,N-bis(hydroxyethyl) aminopropyl triethoxysilane,
beta mercaptoethyl trimethoxysilane,
beta mercaptopropyl trimethoxysilane,
gamma mercaptopropyl trimethoxysilane,
beta(2-mercapto cyclohexyl)ethyl trimethoxysilane,
beta mercaptoethyl triethoxysilane,
gamma mercaptopropyl dimethyl methoxysilane,
beta mercaptoethyl triacetoxysilane, and the like.

The essential feature all silanes useful in this invention possess is a functionality which permits them to engage either in a cross-linking reaction or a copolymerization reaction. In case of these compounds one or more of the $R_2$, $R_3$ or X groups must be hydrolyzed to an (OH) group prior to or after contacting the filler surface.

When applied in aqueous dispersion it is likely that all such hydrolyzable R and X groups are converted to (OH) groups and these, in turn, may be converted, at least in part, to siloxane compounds. All of the above silanes are effective even with minute amounts of water and are at least partially converted into the corresponding silanols which may also then be partially converted into their condensation polymers, the siloxanes. Condensation products of the hydrolyzed or partially hydrolyzed silane esters (siloxanes) as well as the silanols are usually believed to be present.

The amount of silane will be from 0.03 to 2, preferably 0.05 to 0.5 wt. percent based on the total weight of the resin-filler composite. If the filler is precoated with silane, from 0.1 to 2, preferably, 0.2 to 0.75 wt. percent of silane, silanol or siloxane is deposited on the filler surface based on the weight of the filler. The silanes, silanols and siloxanes will be referred to for convenience as "silanes."

Both Buton 200 and Buton 300, which are oxidized Buton 100's, are obtained as 50% and 45% solids solutions, respectively, in solvent by stripping the reaction diluent. Buton 200 is in Solvesso 100 which can be described as an aromatic portion of a platinum hydroformate having the following specifications:

| | | |
|---|---|---|
| Aromatics | vol. percent | 96.45 |
| Olefins | vol. percent | 0.15 |
| Saturates | vol. percent | 3.40 |
| Boiling range | ° F | 325–400 |
| Flash point | ° F | 116 |
| Specific gravity | | 0.8756 |
| Viscosity at 25° C. | cp | 0.806 |

Buton 300 is a solution in a technical grade of xylol. This is Solvesso Xylol which has the following specifications:

Composition, volume percent:

| | |
|---|---|
| Toluene | 1.9 |
| Xylenes | 96.7 |
| $C_9$ aromatics | 1.4 |
| | 100.0 |

Boiling range °F 281–287
Specific gravity 60/60° F. 0.8708
Viscosity, centipoises at 25° C. 31.0
Refractive index at 20° C. 1.4967
Nonvolatile content, g./100 ml. 0.0006
Meets requirements of ASTM D-846

To prevent cross-linking during storage which causes an undue increase in viscosity and thickness, isopropyl alcohol is usually added to the solvent/polymer solution as an inhibitor.

The curing rate of these polymers increases as their oxygen content increases. Less oxygen from the air and less time are required to cure the Buton 200 or 300 polymers as compared to Buton 100, since a large portion of the active sites are reacted during the manufacture of Buton 200 or 300 from Buton 100. Perhaps this occurs because it is not necessary for as much oxygen in the air to work its way through the interior of the film from the film's surface.

The coating will contain 1 to 90, preferably 40 to 60, and most preferably 45 to 55 wt. percent of a suitable filler material, preferably a finely ground sand or silica based on the weight of the dry outer pipe coating. Other suitable filler materials can be used such as siliciferous materials, silicates such as clays, alumina, mica, metals and the like. These can be in the form of finely divided crystals, amorphous powders, flakes, fibers, needles, whiskers and other finely comminuted forms. Small glass spheres or beads such as those sold by Flex-o-Lite Manufacturing Corp. under the trade name Blast-O-Lite Industrial Glass Beads, can also be used. Usually, the harder materials are preferred.

A particularly preferred material is ground sand (quartz) which is commercially obtainable as Supersil or Minusil which is manufactured by the Pennsylvania Glass Sand Company. Also, the finely ground quartz is sometimes referred to as silica flour. Generally, the particle size of this filler material will range within 20 to 180, preferably 50 to 150 microns. The proportions of sizes within this range can vary widely and some variation is desirable to get best results. Generally, any powder of which 90% passes through a 100 mesh screen is usable. Preferably, powders which pass through a 200 mesh to 270 mesh screen are used.

In general, the top coating formulation comprising Butons, preferably Buton 200 and Buton 300 plus filler, i.e., silica, can be used as follows. All parts in the following table are by weight.

| | General Formulation | Intermediate Formulation | Specific Formulation d | |
|---|---|---|---|---|
| | | | Solution | Coating Solids |
| Buton 200 solution a | e 5–50 | 10–15 | 13 | e 6.5 |
| Buton 300 solution b | e 50–5 | 35–45 | 39 | e 17.5 |
| Silica (#200 mesh) | 25–100 | 35–40 | 36 | 36.0 |
| Silane | 0.05–3.0 | 0.1–0.30 | 0.11 | 0.11 |
| Aromatic solvent (such as Solvesso) preferably | 0–15, 1–12 | 6–8 | 6.5 | 0 | a Buton 200 resin solution contains 50 wt. percent resin, 50 wt. percent solvent.
b Buton 300 resin solution contains 45 wt. percent resin, 55 wt. percent solvent.
c No more than 55 parts of Buton solution would usually be used.
d Contains 60 wt. percent of 200 mesh silica in dry coating.
e Resin solids.

The amount of resin in solvent can vary from 40 to 70, preferably 40 to 60, and most preferably 45 to 60 wt. percent.

Any suitable method can be used to apply the compositions of the invention to achieve the finished article with a superior protective coating. One method of achieving a similar protective coating is disclosed in commonly assigned copending application Ser. No. 524,392, entitled "Method of Coating Metal Articles," filed Feb. 2, 1966. This application is incorporated by reference in its entirety in the present application.

In brief, the process of the copending application is described with respect to a pipe (although it can be used with other metal articles) consists of preheating a clean pipe while at a preferred temperature of about 350° to 500° F., rotating the pipe while applying polymer in solvent by means of a spray apparatus within an electrostatic field.

Spraying can be substantially continuous or can be intermittently timed with each rotation so that there is a pause of a few seconds between sprayings at the end of every rotation to allow the solvent to flash off before the next spray application.

When the initial application has a thickness of about 6 mils on a dry basis, the same polymer material but having a silane dissolved therein, is also applied as a spray by means of a similar spray apparatus also in an electrostatic field. Simultaneously with the silane-containing spray, a fine filler material such as silica (quartz) powder is dusted on by a suitable means such as a flock gun which is designed for spraying fine particulate powders.

It is important to recognize that the process of Ser. No. 524,392, described above produces a continuous coating on the article or pipe whereas the process of the instant invention and the resulting article has two or more discrete concentric layers since each layer is cured before the next layer is applied. However, the process as described above for Ser. No. 524,392, can be suitably modified so as to produce coated articles having several distinct cured layers by curing each layer prior to the application of a succeeding layer.

Although it has been disclosed herein that the silane and the filler material, i.e., quartz or silica, are separately mixed into the thermosetting resin, i.e., Buton formulation, it is entirely within the scope of this invention to use silica or other filler materials which have been precoated with silane. The precoating can be accomplished in any suitable manner as will be apparent to one skilled in the art. Usually sufficient silane to supply a monomolecular coating will suffice. Alternatively, precoated silica is becoming commercially available.

After each coating is applied, it is cured before the next coating. Suitable curing techniques include both flame treating and baking. If flame curing is used, the flame of a gas burner is applied to the coating. Usually flame cured films will cure very rapidly, often as quickly as one second although sometimes up to 15 minutes is required. Ordinarily, about 5 seconds to 4 minutes is sufficient. The coatings when cured by this technique will not blister at all. The temperatures of the flame will usually range about 1000° to 1100° F. However, caution must be exercised to avoid heating the film to its ignition temperature.

Alternatively, baking ovens can be used. Baking ovens are available in two types, one, the gas heating variety and the other, the infrared type. The gas heat type of oven depends on the air which surrounds the coating to bring the coating to the temperature required to cure or polymerize the molecules in the coating to a hard plastic coat. The use of infrared or radiant heat utilizes light waves of relatively long wave lengths to heat the coating. Generally, a curing temperature in a gas oven of about 250° to 400° F., preferably 325° to 375° F., for a time of from about 5 to 60 minutes, preferably 20 to 40 minutes, will satisfactorily cure the individual coatings.

One further aspect of the invention should be noted. That is since the resulting product has such superior abrasion resistance, it can be used as an abrasive and the process of the invention utilized as a technique of producing abrasives. Filler materials useful as well as silica (quartz) would include such things as silicon carbide, fused alumina, boron carbide and the like. Thus, the technique of the invention could be used for producing polishing wheels, formed abrasives and the like.

Normally, if the technique of the invention is to be used for forming abrasive materials on a backing member comprising a flexible or rigid fibrous, plastic, paper or metal sheet, the first two layers need not be applied and only the formulated layer containing the filler material, silane and Buton need be used. Also, when formed abrasives such as carborundum wheels or shapes are prepared the base layers are unnecessary.

It is to be emphasized that the invention includes the concept that superior abrasive products can be produced by binding abrasive particles with a thermosetting resin including oxygenated resins and nonoxygenated resins through the use of the silane material. By using the silane, greatly improved bonding of the abrasive particles is possible. In this situation, the thermosetting resin and the silane serve as the binder adhesive for the abrasive particles. Other adhesives besides thermosetting resins can also be used with the silane.

The invention is further illustrated by the following examples.

EXAMPLE 1

In this example, a series of metal articles (metal test panels) were coated with Buton coatings which are variations of a basic formulation described as follows. The initial layer was formulated from a coating composition comprising three parts of Buton 300, one part of Buton 200 and a half part of Solvesso 100. Two coatings of this formulation were applied resulting in two clear coatings having a total dry thickness of about 4 mils. Each of the two coatings were individually cured to various degrees of hardness before applying the succeeding coating.

A top coating formulated from specified parts by weight of the above-described initial coating formulation, specified parts by weight of silica and various parts by weight of epoxy alkyl silane were then applied to the two initial layers and cured.

The curing was accomplished for each of the three coatings by oven baking the coated metal objects at about 350° F. for a time of about 30 minutes.

The top coating formulation was prepared by simply stirring the silica material of specified mesh size into a mixture of the Buton resin formulation and the silane. The resulting formulation was allowed to stand at least 30 minutes prior to application. The silica of this example was ground sand (quartz) as opposed to silica of the natural amorphous type. The results obtained are summarized as follows in Table II.

TABLE II.—PROPERTIES OF SILICA-FILLED BUTON COATINGS [a]

| Topcoat Formulation [b] | | | | Abrasion test [e] (mg. weight loss) | | |
|---|---|---|---|---|---|---|
| Silica | | Weight percent Silane [c] | Pencil Hardness [d] | 1,000 cycles | 2,000 cycles | Direct Impact [f] |
| Weight percent | Mesh size [g] | | | | | |
| None | —— | None | 2H–3H | 14 | 27 | >160 |
| None | —— | 0.28 | F–H | 5 | 6 | 100 |
| 60 | 200 | 0.11 | 4H–5H | <1 | <1 | >160 |
| 60 | 200 | None | 5H–6H | 26 | 46 | 100 |
| 80 | 200 | 0.17 | >7H | 5 | 11 | 120 |
| 60 | 325 | 0.11 | 5H–6H | 7 | 10 | >160 |
| 80 | 325 | 0.17 | >7H | 51 | 73 | >160 |

[a] Coatings were made from Buton pipe coating formulation. They were applied in three coats, each baked 30 minutes at 350° F. The first two coats were clear; the topcoat was formulated as described. The total thickness of all three coats was 6 to 8 mils.
[b] Amounts of silica and silane reported as weight percentages, based on the dry coating.
[c] Dow-Corning Z-6040 (gamma glycidoxypropyl trimethoxysilane).
[d] Hardness of pencil that will just scratch coating. Softest 6B, 5B, . . . 2B, B, HB, F, H, 2H, . . . 7H hardest.
[e] Abrasion test reported as mg. of coating lost during 1,000 and 2,000 cycles of a Taber Abraser using a CS-17 wheel and 500/gm. load.
[f] Direct impact tests were made on coated Q-panels (.032" thick) backed up by a ¼" steel plate. Data reported as maximum impact, in inch pounds, that coating will withstand without failure, as measured with a 67 volt wet sponge holiday tester.
[g] See the following table.

THE TYLER STANDARD SCREEN-SCALE SIEVES

| | Opening (size of particles passed) | | |
|---|---|---|---|
| | Inches | mm. | μ |
| Tyler mesh: | | | |
| 60 | 0.0097 | 0.246 | 246 |
| 80 | 0.0069 | 0.175 | 175 |
| 100 | 0.0058 | 0.147 | 147 |
| 150 | 0.0041 | 0.104 | 104 |
| 200 | 0.0029 | 0.074 | 74 |
| 270 | 0.0021 | 0.053 | 53 |
| 325 | 0.0017 | 0.043 | 43 |
| 400 | 0.0015 | 0.038 | 38 |

Ref. Perry, J. F., Chemical Engineers' Handbook, Third Edition, p. 963.

The data in Table II were analyzed as set forth.

TABLE III.—EFFECTS OF DIFFERENT PARAMETERS ON THE PROPERTIES OF THE SILICA-FILLED BUTON COATINGS OF THIS EXAMPLE [a]

| | Pencil Hardness | Abrasion | | Direct Impact |
|---|---|---|---|---|
| | | 1,000 cycles | 2,000 cycles | |

Effect of adding silica only to Buton (no silane)

| Weight Percent Silica | | | | |
|---|---|---|---|---|
| 0 | 2H–3H | 14 | 27 | >160 |
| [b] 60 | 5H–6H | 26 | 46 | 100 |

Effect of adding silane to Buton

| Wt. Percent Silane | Wt. Percent Silica [b] | | | | |
|---|---|---|---|---|---|
| 0 | 0 | 2H–3H | 14 | 27 | >169 |
| 0.28 | 0 | F–H | 5 | 6 | 100 |
| 0 | 60 | 5H–6H | 26 | 46 | 100 |
| 0.11 | 60 | 4H–5H | <1 | >1 | >160 |

Effect of silica concentration (with silane)

| Weight Percent Silica [b] | | | | |
|---|---|---|---|---|
| 0 | F–H | 5 | 6 | 100 |
| 60 | 4H–5H | <1 | <1 | >169 |
| 80 | >7H | 5 | 11 | 129 |

Effect of silica particle size

| Mesh | Wt. Percent Silica | | | | |
|---|---|---|---|---|---|
| 200 | 60 | 4H–5H | <1 | <1 | >160 |
| 200 | 80 | >7H | 5 | 11 | 120 |
| 325 | 60 | 5H–6H | 7 | 10 | >160 |
| 325 | 80 | >7H | 51 | 73 | >160 |

[a] See footnotes to Table II for explanation of tests.
[b] 200 mesh.

From the above it can be seen that:

(a) The most abrasion resistant coating formulation is a Buton pipe coating resin mixture containing 60 wt. percent silica (200 mesh) on a solids basis, and silane.

(b) Adding silica alone (without silane) improves hardness, but reduces abrasion resistance and impact strength.

(c) Adding silane to Buton coatings, with or without silica, improves abrasion resistance, but reduces hardness slightly.

(d) Adding both silica and silane to Buton improves both hardness and abrasion resistance.

(e) Particle size of the silica is important. Better abrasion resistance is obtained from 200 mesh than from the finer 325 mesh silica.

What is claimed is:

1. A metal article of manufacture having a hard abrasion resistant coating thereon, said coating comprising at least one initial cured layer of from 2 to 6 mils dry thickness of an oxygenated thermosetting resin containing a major proportion of diolefinic units and an oxygen content of from about 5 to 20% and a second cured layer of from 2 to 6 mils dry thickness of a coating formulation comprising from about 10 to 55 parts by weight of said oxygenated thermosetting resin, from about 0.05 to 3 parts by weight of a silane having a functional or unsaturated organic group which is attached directly to a carbon atom, and from about 25 to 100 parts by weight of a finely divided inorganic filler material having a particle size of which about 90% will pass through a 100 mesh screen.

2. An article according to claim 1 wherein said resin is a copolymer of about 75% butadiene and 25% styrene.

3. An article according to claim 1 wherein said filler material is a finely divided silica having a particle size of which about 90% will pass through a 200 mesh screen.

4. An article according to claim 1 wherein said resin is a hydrocarbon copolymer containing polar groups.

5. An article according to claim 1 which is a metal pipe.

6. An article according to claim 1 wherein said resin is a copolymer of about 75% butadiene and 25% styrene having a molecular weight of about 1800 to 3500 (in the unoxidized form) with an oxygen content of about 5 to 20% and said filler material is silica and has a particle size such that about 90% passes through a 200 mesh and said silane is defined by the following general structure

wherein $R_1$ is selected from the group consisting of substituted or unsaturated organic groups; X is selected from the group consisting of halogen, hydroxyl, acyloxy and alkoxy; and $R_2$ and $R_3$ are each independently selected from the group consisting of $R_1$, X and methyl, wherein the number of carbon atoms in the molecule does not exceed 20.

References Cited

UNITED STATES PATENTS

| | | | |
|---|---|---|---|
| 2,930,710 | 3/1960 | Koenecke et al. | 117—75 X |
| 2,963,045 | 12/1960 | Canevari et al. | 117—94 X |
| 2,994,619 | 8/1961 | Eilerman. | |
| 3,294,573 | 12/1966 | Michael et al. | 117—94 X |

WILLIAM D. MARTIN, Primary Examiner

R. HUSACK, Assistant Examiner

U.S. Cl. X.R.

51—298; 117—46, 71, 94, 132, 135.1, 161; 138—145, 146